(12) United States Patent
van de Loecht et al.

(10) Patent No.: US 9,051,132 B2
(45) Date of Patent: Jun. 9, 2015

(54) TRANSFER ARRANGEMENT FOR TRANSFERRING ARTICLES

(75) Inventors: Heinrich van de Loecht, Muggensturm (DE); Martin Reinisch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/115,394

(22) PCT Filed: Mar. 19, 2012

(86) PCT No.: PCT/EP2012/054807
§ 371 (c)(1),
(2), (4) Date: Nov. 4, 2013

(87) PCT Pub. No.: WO2012/150086
PCT Pub. Date: Nov. 8, 2012

(65) Prior Publication Data
US 2014/0076692 A1 Mar. 20, 2014

(30) Foreign Application Priority Data

May 3, 2011 (DE) .......................... 10 2011 075 174

(51) Int. Cl.
*B65G 47/82* (2006.01)
*B65G 47/28* (2006.01)
(Continued)

(52) U.S. Cl.
CPC .............. *B65G 47/82* (2013.01); *B65G 47/88* (2013.01); *B65G 47/28* (2013.01); *B65G 47/31* (2013.01); *B65G 47/841* (2013.01); *B65G 54/02* (2013.01)

(58) Field of Classification Search
CPC ........ B65G 47/82; B65G 47/88; B65G 47/28; B65G 47/31; B65G 54/02
USPC ............ 198/619, 725, 460.1, 805, 728, 419.3
See application file for complete search history.

(56) References Cited

U.S. PATENT DOCUMENTS 3,902,587 A * 9/1975 Checcucci .................. 198/419.3
5,893,701 A * 4/1999 Pruett ......................... 414/798.2

(Continued)

FOREIGN PATENT DOCUMENTS

DE 102009029314 8/2010
EP 1123886 8/2001
(Continued)

OTHER PUBLICATIONS

International Search Report for Application No. PCT/EP2012/054807 dated Jun. 15, 2012 (English Translation, 2 pages).

*Primary Examiner* — Mark A Deuble
(74) *Attorney, Agent, or Firm* — Michael Best & Friedrich LLP

(57) ABSTRACT

The invention relates to a transfer arrangement (10; 10*a*) for transferring articles (1), having a first conveying arrangement (11) for the articles (1), on which the articles (1) are conveyed at in particular non-uniform intervals (a) from one another, and having at least one transporting element (38) with a transfer element (44) for butting against an article (1) along a transporting route in the region of the transfer arrangement (10; 10*a*) and for transfer from the transporting route onto a second conveying arrangement (15), wherein the at least one transporting element (38) is arranged such that it can be moved along a closed transporting path (30) which has a multiplicity of preferably individually energizable coil elements (36) which are in operative connection with at least one permanent-magnet element (39), arranged at least indirectly on the transporting element (38), and cause the transporting element (38) to move along the transporting path (30) when the coil elements (36) are energized, wherein a control arrangement activates the coil elements (36) in order to generate a movement profile of the transporting element (38), and wherein an arrangement with means (41, 42) for detecting the position of the transporting element (38) is provided along the transporting path (30). According to the invention, it is provided that the first conveying arrangement (11), in a transfer region (26) for transferring the articles (1) to the transporting route of the transfer arrangement (10), is aligned with the transporting route, and that the movement profile of the transporting element (38) is such that, when the article (1) is received by the transfer element (44), the transfer element (44) comes into contact with the article (1) in an at least more or less impact-free manner.

24 Claims, 2 Drawing Sheets

(51) Int. Cl.
*B65G 47/88* (2006.01)
*B65G 54/02* (2006.01)
*B65G 47/31* (2006.01)
*B65G 47/84* (2006.01)

(56) References Cited

U.S. PATENT DOCUMENTS

| | | | |
|---|---|---|---|
| 5,947,361 A * | 9/1999 | Berger et al. | 226/92 |
| 6,866,136 B2 * | 3/2005 | Veit et al. | 198/370.02 |
| 6,876,107 B2 | 4/2005 | Jacobs | |
| 6,876,896 B1 * | 4/2005 | Ortiz et al. | 700/112 |
| 7,665,598 B2 * | 2/2010 | Begin et al. | 198/419.3 |
| 2010/0084247 A1 | 4/2010 | Wipf et al. | |

FOREIGN PATENT DOCUMENTS

| | | |
|---|---|---|
| EP | 1300351 | 4/2003 |
| WO | 9850760 | 11/1998 |
| WO | 2010085670 | 7/2010 |

* cited by examiner

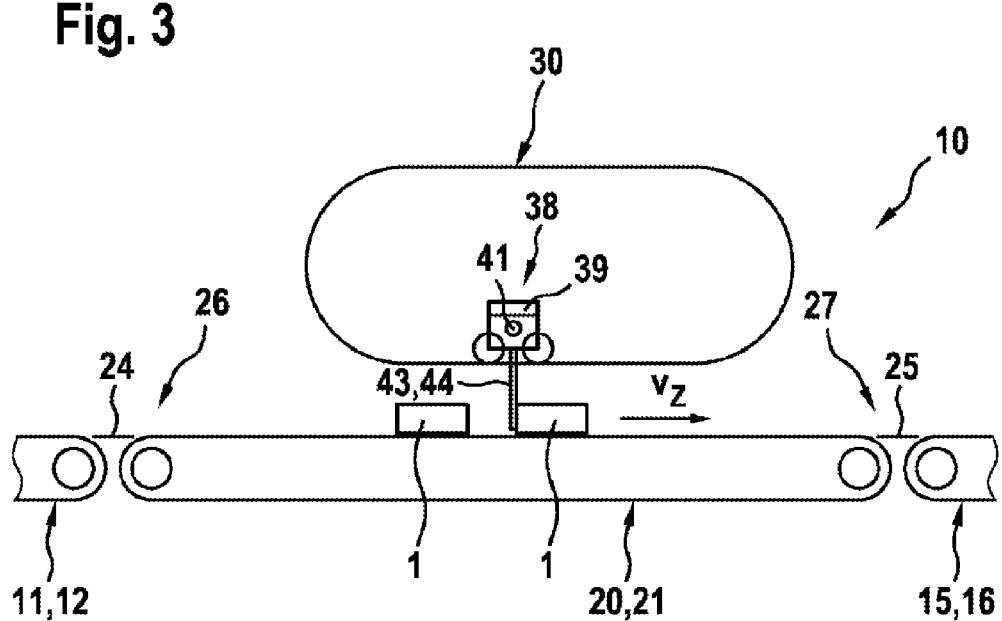
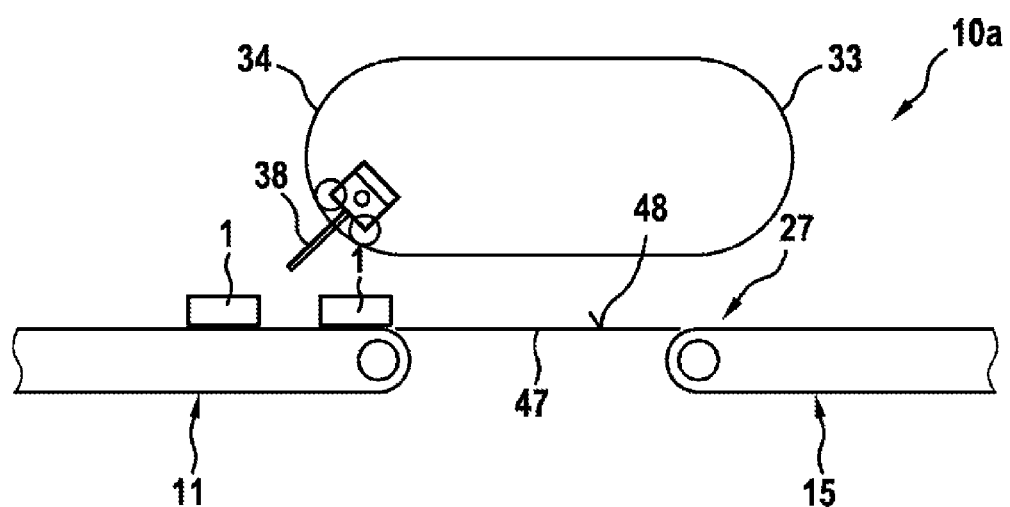

TRANSFER ARRANGEMENT FOR TRANSFERRING ARTICLES

BACKGROUND OF THE INVENTION

The invention relates to a transfer arrangement for transferring articles.

Such a transfer arrangement is known from U.S. Pat. No. 6,876,107 B2. In the case of the known transfer arrangement, transfer elements are arranged on a closed transporting path of the transfer arrangement, and these transfer elements can be moved individually by means of individually energizable coil elements, arranged on the transporting path, by the coil elements interacting with permanent-magnet elements which are in operative connection on the transfer elements. In the case of an exemplary embodiment which is illustrated in FIG. 5 of the aforementioned document, a first conveying arrangement feeds articles to the transfer arrangement, wherein the first conveying arrangement, in the transfer region of the articles from the first conveying arrangement to the transfer elements of the transfer arrangement, is oriented perpendicularly to the movement direction of the transfer elements. Once the articles have been transferred to the transfer arrangement, the respective transfer element transports the article in order to be transferred to a second conveying arrangement at another location of the transporting path, from where the articles are discharged into the second conveying arrangement. It is also mentioned, in the known document, that the transfer elements are moved preferably in accordance with a mathematical function based on a seventh-order polynomial.

A critical factor in the case of the transfer system known from U.S. Pat. No. 6,876,107 B2 is that, in order for the articles to be received into the transfer arrangement from the first conveying arrangement by the transfer element, it is necessary, as a result of the first conveying arrangement being situated vertically in the transfer region, for the transfer element to be accelerated out of a standstill position, or out of a standby position, in order to avoid damage to the articles. This limits the output of the known transfer arrangement. Furthermore, in the case of the known document, the first conveying arrangement terminates in a plane above the transporting route of the transfer arrangement and the articles pass into the region of the transfer element by being expelled from the first conveying arrangement. Such handling of the articles, if the latter are sensitive, is likewise not possible.

SUMMARY OF THE INVENTION

Proceeding from the presented prior art, it is an object of the invention to develop a transfer arrangement for transferring articles such that articles can be received into the region of the transfer arrangement from the first conveying arrangement in a particularly careful manner, the intention being, at the same time, to realize the highest possible output for the transfer arrangement. This object is achieved in the case of a transfer arrangement for transferring articles according to the invention. The invention is based on the concept of the first conveying arrangement, in a transfer region for transferring the articles to the transfer arrangement, being aligned with the transporting route for transporting the articles in the transfer arrangement, and of the movement profile of the transfer element being such that, when the article is received by the transfer element, the transfer element comes into contact with the article in an at least more or less impact-free manner. In other words, this means that, when the articles are transferred from the first conveying arrangement to the transfer element, the article is subjected to barely any acceleration or any force which could damage the article. As a result, the transfer arrangement according to the invention is suitable, in particular, for particularly sensitive articles, for example impact-sensitive and/or pressure-sensitive articles in the food industry, for example biscuits, etc.

Advantageous developments of the article-transfer arrangement according to the invention are given in the dependent claims. All combinations of at least two features disclosed in the claims, the description and/or the figures fall within the framework of the invention.

Fifth-order or seventh-order polynomials or sine functions have proven to be particularly suitable movement profiles of the transporting element for careful handling purposes. Such a movement profile achieves at least more or less impact-free abutment of the transfer element against the respective article.

In a first configuration of the invention, it is provided that the transporting route is designed as a rigid transporting surface on which the articles slide along, and that the articles are at least received from the first conveying arrangement in a curved portion which belongs to the transporting path and in which the transfer element pivots in the direction of the article. Such a design has the advantage that it is possible to provide a particularly straightforward design for the transporting surface for the articles in the region of the transfer arrangement. However, this configuration presupposes that at least the first conveying arrangement extends, at least in part, into the region of the transporting path of the transfer element so that, even before the articles are received from the first conveying arrangement, it is possible for the transfer element to come into contact with the article.

In an alternative configuration of the invention, it may be provided that the transporting route is designed as an additional, endlessly circulating conveying arrangement on which articles are conveyed preferably at constant speed, and that at least the abutting contact of the transfer element against the article takes place in the region of the additional conveying arrangement. In the case of such a configuration, it is possible for the transfer element to advance toward the article from the rear while the latter is being conveyed by the endlessly circulating conveying arrangement. It is thus possible to have, in particular, relatively long article-receiving and/or article-transfer routes, which allow particularly careful transportation and/or particularly careful receiving and/or transfer operations.

In order either to adapt the conveying speed in the region of the transfer arrangement to the conveying speed of the second conveying arrangement or to influence the spacing between the articles in the region of the second conveying arrangement, it is also provided, in a further configuration of the invention, that the transfer element accelerates or decelerates the article in the region of the transporting route in relation to the speed in the transfer region from the first conveying arrangement to the transfer element.

It is also important for transfer from the transfer arrangement to the second conveying arrangement to take place as carefully as possible. It is therefore provided, in a further configuration of the invention, that the article, in the transfer region from the transporting route to the second conveying arrangement, has a speed which corresponds to the conveying speed of the second conveying arrangement.

In order to avoid, in particular, pronounced changes in direction and/or impact-like loading during the article-transfer and/or article-receiving operations between the individual conveying arrangements and the transfer arrangement, it is provided, in a further configuration of the invention, that the second conveying arrangement, in the transfer region, is aligned with the conveying route, and that the two conveying arrangements and the conveying route form a planar conveying plane for the articles.

Furthermore, the spacing between the articles in the region of the second conveying arrangement can be influenced relatively straightforwardly if the second conveying arrangement has a variable conveying speed. It is thus possible, in the case of articles conveyed at regular spacings by the transfer elements, for example for the spacing between the articles on the second conveying arrangement to be reduced, by the speed of the second conveying arrangement being reduced temporarily before the articles are transferred from the transfer arrangement to the second conveying arrangement.

The transfer system according to the invention, in addition to being suitable for continuously operated first conveying arrangements, is also suitable, according to the invention, for cyclically operated first conveying arrangements. In this case, it is necessary, for example, for the transfer finger, at the point of transfer of the articles from the first conveying arrangement to the transfer system, to reduce its speed to a value of zero.

The transfer arrangement according to the invention is particularly preferably used as a constituent part of a packaging installation, wherein the second conveying arrangement feeds the articles, in particular, to a cartoner or a tubular-bag machine.

BRIEF DESCRIPTION OF THE DRAWINGS

Further advantages, features and details of the invention can be gathered from the following description of preferred exemplary embodiments and with reference to the drawing, in which:

FIGS. 1 to 3 show a vastly simplified illustration of a first article-transfer arrangement according to the invention during different operating phases, and FIG. 4 shows a likewise simplified illustration of a transfer arrangement which has been modified in relation to FIGS. 1 to 3.

DETAILED DESCRIPTION

Like components and/or components with like functions are provided with the same reference signs in the figures.

Figure 1:
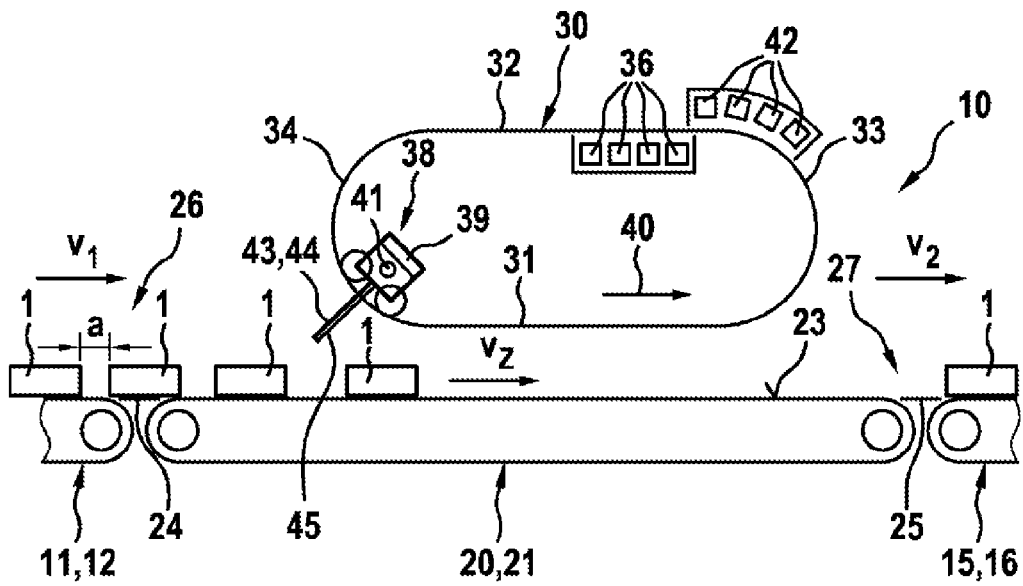
Figure 2:
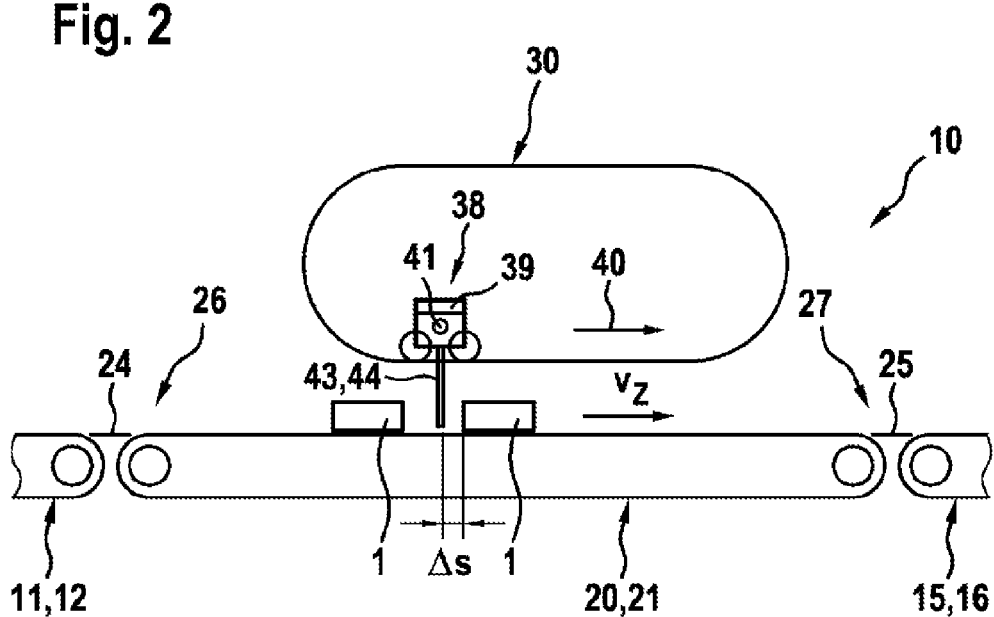

FIGS. 1 to 3 illustrate a first transfer arrangement 10 for transferring articles 1. The transfer arrangement 10 here is, in particular, a constituent part of a relatively extensive packaging installation, and the articles 1 may be, for example, relatively impact-sensitive and/or fragile articles 1 which can withstand possibly only relatively low levels of mechanical loading.

The transfer arrangement 10 follows a first conveying arrangement 11, which in the exemplary embodiment is designed as an endlessly circulating conveying belt 12, only part of which is illustrated in FIG. 1. The conveying belt 12 is driven either continuously or cyclically. By means of the transfer arrangement 10, the articles 1 are transferred from the first conveying arrangement 11 to a downstream, second conveying arrangement 15, which in the exemplary embodiment is likewise designed as an endlessly circulating conveying belt 16. The conveying belt 16 conveys the articles 1, for example, to a downstream cartoner or a tubular-bag machine, neither of which is illustrated in the figures.

In the region of the transfer arrangement 10, the latter has an additional conveying arrangement 20 as a constituent part of the transfer arrangement 10, said conveying arrangement likewise being designed as an endlessly circulating conveying belt 21 and forming a transporting route for the articles 1 in the region of the transfer arrangement 10.

It is important for the conveying arrangements 11, 15 and 20 for the articles 1 to form an at least more or less planar and gap-free transporting plane 23, wherein it is possible to arrange, between the individual conveying arrangements 11 and 15 and also 15 and 20, for example plate-like elements 24, 25, which ensure a more or less gapless and/or gap-free transition between the individual conveying arrangements 11, 15 and 20. It is also important for the conveying arrangements 11 and 20 to be aligned with one another in their transfer region 26, and for the conveying arrangements 15 and 20 to be aligned with one another in their transfer region 27, such that, when the articles 1 are being transferred from the first conveying arrangement 11 to the additional conveying arrangement 20 and from the additional conveying arrangement 20 to the second conveying arrangement 15, the articles 1 are conveyed rectilinearly, i.e. without any changes in direction (in a plane perpendicular to the drawing plane of FIGS. 1 to 3).

On the first conveying arrangement 11, the articles 1 are conveyed at a speed $v_1$. On the additional conveying arrangement 20, the articles 1 are conveyed at a speed $v_z$ and, on the second conveying arrangement 15, the articles 1 are conveyed at the speed $v_2$.

The transfer arrangement 10, which is arranged essentially above the additional conveying arrangement 20, has an oval, endless transporting path 30. The transporting path 30 comprises two portions 31, 32, which are arranged rectilinearly and parallel to the additional conveying arrangement 20, and two curved portions 33, 34, which connect the rectilinear portions 31, 32 to one another and are each semicircular in the exemplary embodiment. A multiplicity of preferably individually activatable coil elements 36 are arranged along the transporting path 30, only some of these coil elements 36 being illustrated in FIG. 1. However, the coil elements 36 run along the entire transporting path 30, on the inside of the transporting path 30 in the exemplary embodiment illustrated.

The coil elements 36, which are activated by a control arrangement (not illustrated), serve for driving transporting elements 38 which are arranged such that they can be moved along the transporting path 30. For this purpose, each of the transporting elements 38, of which, to aid clarity, only a single transporting element 38 has been illustrated in the figures, has at least one permanent-magnet element 39, which is in operative connection with the coil elements 36. The transporting elements 38 are driven in that the coil elements 36 are energized one after the other in the movement direction of the transporting elements 38, in the exemplary embodiment in the counterclockwise direction of arrow 40, such that the respective coil elements 36 subject the permanent-magnet elements 39 on the transporting elements 38 to an attracting or repelling force, which causes the respective transporting element 38 to be driven.

In addition, each transporting element 38 has a first means 41, which serves for detecting the position of the respective transporting element 38 along the transporting path 30. For this purpose, the first means 41 interacts, for example, with second means 42, which are arranged at a fixed location on the transporting path 30 and of which likewise only a few are illustrated in FIG. 1. The means 41, 42 may have, for example, Hall-effect elements. The position of the transporting elements 38 is fed to the control arrangement of the transfer arrangement 10 as an input signal, from which said control arrangement calculates the corresponding activating and/or energizing level for the coil elements 36.

Energizing the coil elements 36 allows the transporting element 38 to be moved with any desired speed profile. In particular here, it is conceivable to have speed profiles which are corresponding in the form of a fifth-order or seventh-order polynomial or of a sine² function.

As is evident with reference to FIGS. 1 to 3, the additional conveying arrangement 20 is of such a length that it projects beyond the length of the transporting path 21 or of the one rectilinear portion 31 and of the two curved portions 33, 34, which adjoin the portion 31. It can also be seen that each of the transporting elements 38 is assigned a transfer element 44 designed as a pushing finger 43. The pushing finger 43 is fastened in an interchangeable manner, preferably as a format part, on the transporting element 38. The pushing finger 43 has an abutment surface 45 for butting against the respective article 1.

The articles 1 are conveyed on the first conveying arrangement 11 in particular at non-uniform spacings a from one another. It is at these spacings a that the articles 1 also pass from the first conveying arrangement 11 onto the additional conveying arrangement 20, as can be seen, in particular, with reference to FIG. 1. A transporting element 38 for conveying an article 1 is activated by the control arrangement to the transfer arrangement 10 such that the pushing finger 43 of the transporting element, in the curved portion 33, penetrates between two articles 1 at a spacing a from one another, wherein the pushing finger 43 does not make contact with either of the two articles 1.

Corresponding to the illustration of FIGS. 2 and 3, the relevant transporting element 38 is then accelerated to a speed which is greater than the speed $v_z$ of the article 1 on the additional conveying arrangement 20, and therefore the spacing Δs between the article 1 and the pushing finger 43 is gradually reduced. This takes place by means of the aforementioned speed profiles so as to achieve preferably at least more or less impact-free abutment of the pushing finger 43 against the associated article 1 in accordance with FIG. 3.

As soon as the pushing finger 43 is in abutting contact with the relevant article 1, the relevant pushing finger 43 and/or the transporting element 38 thereof can be accelerated to a speed which is greater than the speed $v_z$ of the additional conveying arrangement 20. This gives rise to an increase in the spacing between the successive articles 1 in the region of the additional conveying arrangement 20 and, in particular, to an equal spacing between the articles 1 (in contrast to the articles 1 being conveyed at non-uniform spacings on the first conveying arrangement 11). As conveying continues, the pushing finger 43 is, for example, decelerated again, and therefore it becomes detached from its relevant article 1 and further on, along the curved portion 34, loses its operative connection with the article 1.

In order to make it possible for the articles 1 to be conveyed as smoothly as possible on the conveying arrangements 11, 15 and 20, the latter have, in particular, equal conveying speeds $v_1$, $v_2$ and.

FIG. 4 illustrates a modified transfer arrangement 10a. This differs from the transfer arrangement 10 by the additional conveying arrangement 20 being replaced by an in particular planar sliding plate 47, onto which the articles 1 are conveyed from the first conveying arrangement 11. From the sliding plate 47, the articles 1 pass, once again, onto the second conveying arrangement 15. Together with the conveying strand of the two conveying arrangements 11, 15, the sliding plate 47 likewise forms a more or less gap-free, planar transporting plane 48. It is also critical that, in the case of the transfer arrangement 10a, the corresponding transporting element 38 is already in abutting contact with the article 1 when the latter is still located on the first conveying arrangement 11. Here too, the transporting element 38 is moved such that it comes into contact with the article 1 in at least a more or less impact-free manner. This achieves, overall, smooth transfer of the article 1 from the first conveying arrangement 11 to the sliding plate 47, on which the articles 1 slide along. This is achieved by the transfer element 44 pivoting in the direction of the article 1 in the curved portion 34, that is to say still level with the first conveying arrangement 11. As the articles 1 are being conveyed on the sliding plate 47, they can be conveyed at any desired speed by means of the transporting elements 38. This serves, in particular, to influence the spacing between the articles 1 on the following, second conveying arrangement 15. The important factor, however, is that, in the transfer region 27 from the sliding plate 47 to the second conveying arrangement 15, the pushing finger 43 or the article 1 has such a speed as to correspond to the speed of the second conveying arrangement 15, wherein the transfer element 44 is pivoted away from the article 1 in the curved portion 33, which coincides with the second conveying arrangement 15. The transfer arrangements 10, 10a described thus far can be modified in a variety of different ways without departing from the concept of the invention. Therefore, it is conceivable, for example, for the first conveying arrangement 11 to be driven cyclically, rather than continuously. It is also conceivable for the second conveying arrangement 15 to be driven at a variable speed, so that, for example, the spacing between the individual articles 1 on the second conveying arrangement 15 is increased or reduced.

In the exemplary embodiment illustrated, the articles 1 run beneath the transporting path 30. It is also possible, within the framework of the invention, for the articles 1 to be conveyed above the transporting path 30 by means of the pushing fingers 43. In this case, it may be provided, for example, for the additional conveying arrangement 20 or the sliding plate 47 to have a corresponding longitudinal slot, through which the relevant pushing finger 43 projects from beneath in order thus to come into abutting contact with the article 1.

What is claimed is:

1. A transfer arrangement (10; 10a) for transferring articles (1), having a first conveying arrangement (11) for the articles (1), on which the articles (1) are conveyed, and having at least one transporting element (38) with a transfer element (44) for butting against an article (1) along a transporting route in a region of the transfer arrangement (10; 10a) and for transfer from the transporting route to a second conveying arrangement (15), wherein the at least one transporting element (38) is arranged such that it can be moved along a closed transporting path (30) which has a multiplicity of coil elements (36) which are in operative connection with at least one permanent-magnet element (39), arranged at least indirectly on the transporting element (38), and cause the transporting element (38) to move along the transporting path (30) when the coil elements (36) are energized, wherein a control arrangement activates the coil elements (36) in order to generate a movement profile of the transporting element (38), and wherein there is an arrangement with means (41, 42) for detecting the position of the transporting element (38) along the transporting path (30), characterized in that the first conveying arrangement (11), in a transfer region (26) for transferring the articles (1) to the transporting route of the transfer arrangement (10), is aligned with the transporting route, and in that the movement profile of the transporting element (38) is such that, when the article (1) is received by the transfer element (44), the transfer element (44) comes into contact with the article (1) in an at least more or less impact-free manner, characterized in that the transporting route is designed as an additional, endlessly circulating conveying arrangement (20) on which the articles (1) are conveyed, and in that at least the abutting contact of the transfer element (44) against the article (1) takes place in the region of the additional conveying arrangement (20), characterized in that the movement profile of the transporting element (38) is such that the transfer element (44) is disposed initially behind and spaced apart from the article (1) traveling on the additional conveying arrangement (20) and is then accelerated to a speed greater than a speed (Vz) of the additional conveying arrangement (20) to reduce a space (Δs) between the transfer element (44) and the article (1), characterized in that the movement profile of the transporting element (38) is such that as the space (Δs) is reduced, the transfer element (44) decelerates to slow down and come into contact with the article (1) in the at least more or less impact-free manner, and characterized in that the movement profile of the transporting element (38) is such that after the transfer element (44) is in contact with the article (1), a speed of transfer element (44) is changed to a speed different than the speed (Vz) of the additional conveying arrangement (20).

2. The transfer arrangement as claimed in claim 1, characterized in that the movement profile of the transporting element (38) is in the form of a fifth-order or seventh-order polynomial or of a $\sin^2$ function.

3. The transfer arrangement as claimed in claim 1, characterized in that the articles (1) are at least received from the first conveying arrangement (11) in a curved portion (33, 34) which belongs to the transporting path (30) and in which the transfer element (44) pivots in the direction of the article (1).

4. The transfer arrangement as claimed in claim 1, characterized in that the transfer element (44) accelerates or decelerates the article (1) in the region of the transporting route in relation to a speed ($v_1$) in the transfer region (26) from the first conveying arrangement (11) to the transfer element (44).

5. The transfer arrangement as claimed in claim 1, characterized in that the article (1), in the transfer region (27) from the transporting route to the second conveying arrangement (15), has a speed ($v_z$) which corresponds to the conveying speed ($v_2$) of the second conveying arrangement (15).

6. The transfer arrangement as claimed in claim 1, characterized in that the second conveying arrangement (15), in the transfer region (27), is aligned with the conveying route of the transfer arrangement (10; 10a), and in that the two conveying arrangements (11, 15) and the conveying route of the transfer arrangement (10; 10a) form a planar transporting plane (23; 48) for the articles (1).

7. The transfer arrangement as claimed in claim 1, characterized in that the second conveying arrangement (15) has a variable conveying speed ($v_2$).

8. The transfer arrangement as claimed in claim 1, characterized in that the first conveying arrangement (11) is driven cyclically.

9. The transfer arrangement as claimed in claim 1, characterized in that the transfer arrangement (10; 10a) is a constituent part of a packaging installation.

10. The transfer arrangement as claimed in claim 1, characterized in that the first conveying arrangement (11) conveys the articles (1) at non-uniform spacings (a) from one another.

11. The transfer arrangement as claimed in claim 1, characterized in that the closed transporting path (30) has a multiplicity of individually energizable coil elements (36) which are in operative connection with the at least one permanent-magnet element (39).

12. The transfer arrangement as claimed in claim 1, characterized in that the transfer arrangement (10; 10a) is a constituent part of a packaging installation, and in that the second conveying arrangement (15) feeds the articles to a cartoner or a tubular-bag machine.

13. The transfer arrangement as claimed in claim 1, characterized in that the movement profile of the transporting element (38) is such that after the transfer element (44) is in contact with the article (1), the transfer element (44) is accelerated to a speed greater than the speed (Vz) of the additional conveying arrangement (20) to increase a spacing between the article (1) and successive articles (1) on the additional conveying arrangement (20).

14. The transfer arrangement as claimed in claim 1, characterized in that the movement profile of the transporting element (38) is such that over time the movement profile of the transporting element (38) creates equal spacing between the articles (1) traveling on the additional conveying arrangement (20).

15. The transfer arrangement as claimed in claim 1, characterized in that the movement profile of the transporting element (38) is such that the transfer element (44) is disposed initially between and spaced apart from two articles (1) traveling on the additional conveying arrangement (20) before being accelerated toward one of the two articles (1).

16. The transfer arrangement as claimed in claim 1, characterized in that the additional conveying arrangement (20) has a first length along a direction of movement of the articles (1), and in that the closed transporting path (30) has a portion that is parallel to the additional conveying arrangement (20) that has a second length along the direction of movement of the articles (1), and characterized in that the first length is greater than the second length.

17. The transfer arrangement as claimed in claim 1, characterized in that the movement profile of the transporting element (38) is such that as the space (Δs) is reduced, the transfer element (44) decelerates to slow down to match the speed (Vz) of the additional conveying arrangement (20), so as to contact the article (1) in the at least more or less impact-free manner.

18. A transfer arrangement (10; 10a) for transferring articles (1), having a first conveying arrangement (11) for the articles (1), on which the articles (1) are conveyed, and having at least one transporting element (38) with a transfer element (44) for butting against an article (1) along a transporting route in a region of the transfer arrangement (10; 10a) and for transfer from the transporting route to a second conveying arrangement (15), wherein the at least one transporting element (38) is arranged such that it can be moved along a closed transporting path (30) which has a multiplicity of coil elements (36) which are in operative connection with at least one permanent-magnet element (39), arranged at least indirectly on the transporting element (38), and cause the transporting element (38) to move along the transporting path (30) when the coil elements (36) are energized, wherein a control arrangement activates the coil elements (36) in order to generate a movement profile of the transporting element (38), and wherein there is an arrangement with means (41, 42) for detecting the position of the transporting element (38) along the transporting path (30), characterized in that the first conveying arrangement (11), in a transfer region (26) for transferring the articles (1) to the transporting route of the transfer arrangement (10), is aligned with the transporting route, and in that the movement profile of the transporting element (38) is such that, when the article (1) is received by the transfer element (44), the transfer element (44) comes into contact with the article (1) in an at least more or less impact-free manner, and characterized in that the movement profile of the transporting element (38) is in the form of a fifth-order or seventh-order polynomial or of a $\sin^2$ function.

19. The transfer arrangement as claimed in claim 18, characterized in that the transporting route is designed as a rigid transporting surface (47) on which the articles (1) slide along, and in that the articles (1) are at least received from the first conveying arrangement (11) in a curved portion (33, 34) which belongs to the transporting path (30) and in which the transfer element (44) pivots in the direction of the article (1).

20. The transfer arrangement as claimed in claim 18, characterized in that the transfer element (44) accelerates or decelerates the article (1) in the region of the transporting route in relation to a speed ($v_1$) in the transfer region (26) from the first conveying arrangement (11) to the transfer element (44).

21. The transfer arrangement as claimed in claim 18 characterized in that the article (1), in the transfer region (27) from the transporting route to the second conveying arrangement (15), has a speed ($v_z$) which corresponds to the conveying speed ($v_2$) of the second conveying arrangement (15).

22. The transfer arrangement as claimed in claim 18, characterized in that the second conveying arrangement (15), in the transfer region (27), is aligned with the conveying route of the transfer arrangement (10; 10*a*), and in that the two conveying arrangements (11, 15) and the conveying route of the transfer arrangement (10; 10*a*) form a planar transporting plane (23; 48) for the articles (1).

23. The transfer arrangement as claimed in claim 18, characterized in that the second conveying arrangement (15) has a variable conveying speed ($v_2$).

24. The transfer arrangement as claimed in claim 18, characterized in that the first conveying arrangement (11) is driven cyclically.

\* \* \* \* \*